United States Patent [19]
Aoyama

[11] 4,171,927
[45] Oct. 23, 1979

[54] LOADING AND TRANSPORT VEHICLE

[76] Inventor: Kenneth M. Aoyama, 803 Mace Blvd., Davis, Calif. 95616

[21] Appl. No.: 877,263

[22] Filed: Feb. 13, 1978

[51] Int. Cl.² ............................................. B60P 1/38
[52] U.S. Cl. .................................... 414/460; 414/495; 414/523
[58] Field of Search ............... 214/390, 392, 394, 396, 214/505, 508, 512, 83.26, 6 B, 1 HH, DIG. 4, 350, 351, 352

[56] References Cited

U.S. PATENT DOCUMENTS

| | | | |
|---|---|---|---|
| 2,675,934 | 4/1954 | Kennedy | 214/394 X |
| 3,019,926 | 2/1962 | Christenson | 214/392 |
| 4,046,274 | 9/1977 | Libersky | 214/508 X |
| 4,076,137 | 2/1978 | Kucera | 214/394 |
| 4,081,094 | 3/1978 | Pereira | 214/505 X |

Primary Examiner—Albert J. Makay
Attorney, Agent, or Firm—Lothrop & West

[57] ABSTRACT

A loading and transport vehicle, especially for a load like a cotton module, has an elongated, relatively high main frame supported on some ground-engaging wheels. An elongated conveyor frame carries a horizontal conveyor belt driven preferably at a surface speed coordinated with the rotational speed of a ground-engaging wheel. The conveyor frame is supported through vertically movable, hydraulically expansible chambers on the main frame and is guided for movement between a horizontal position on the ground and a higher horizontal position pressing a load on the conveyor belt against a ceiling on the main frame. The chambers may put force on the conveyor frame to lift the ground-engaging wheels, which can then be moved transversely to vary the tread between one position beneath the conveyor frame and another position alongside the conveyor frame.

8 Claims, 8 Drawing Figures

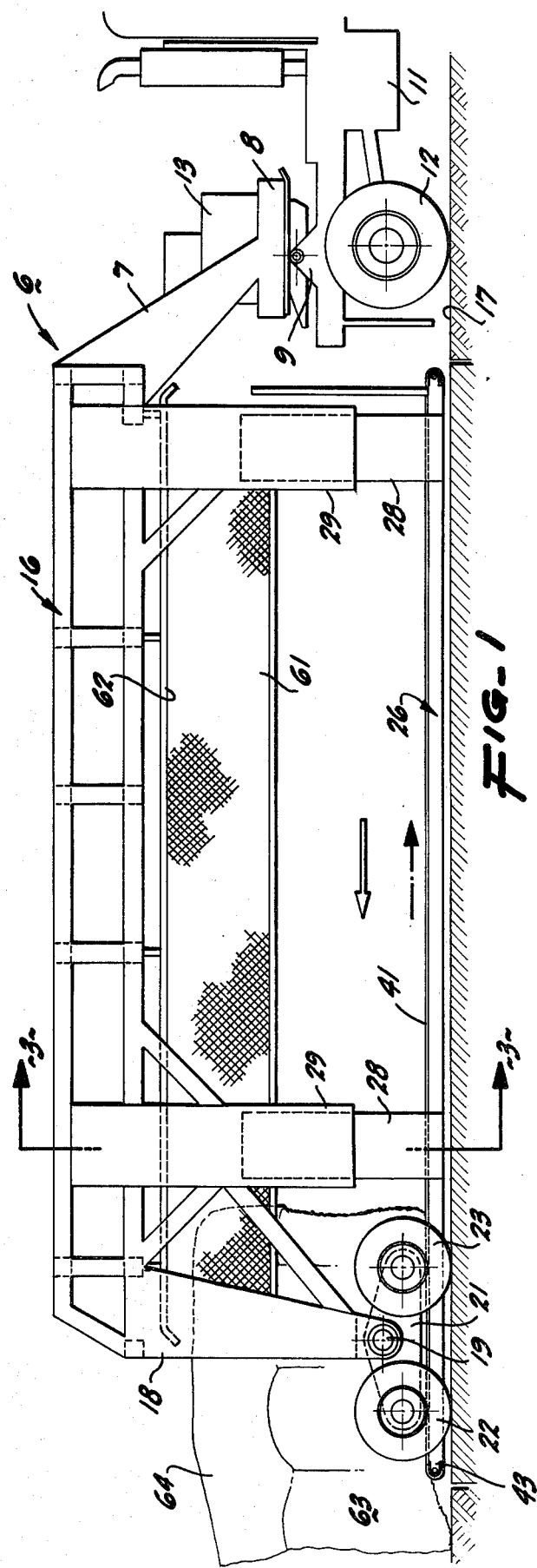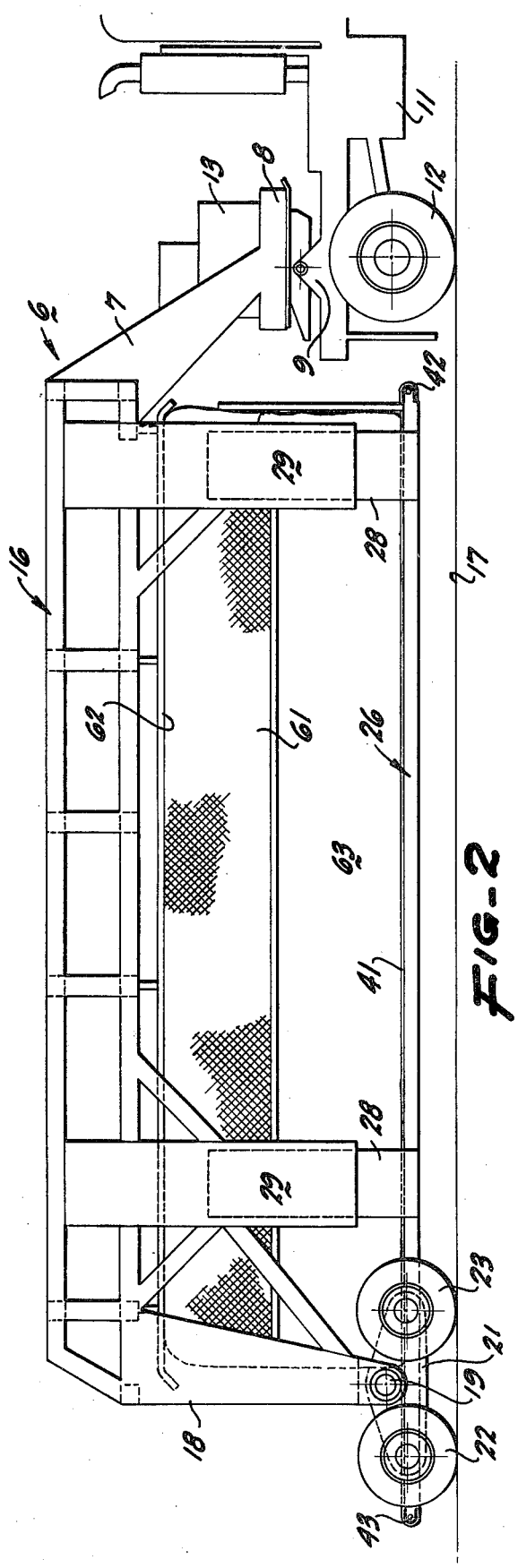

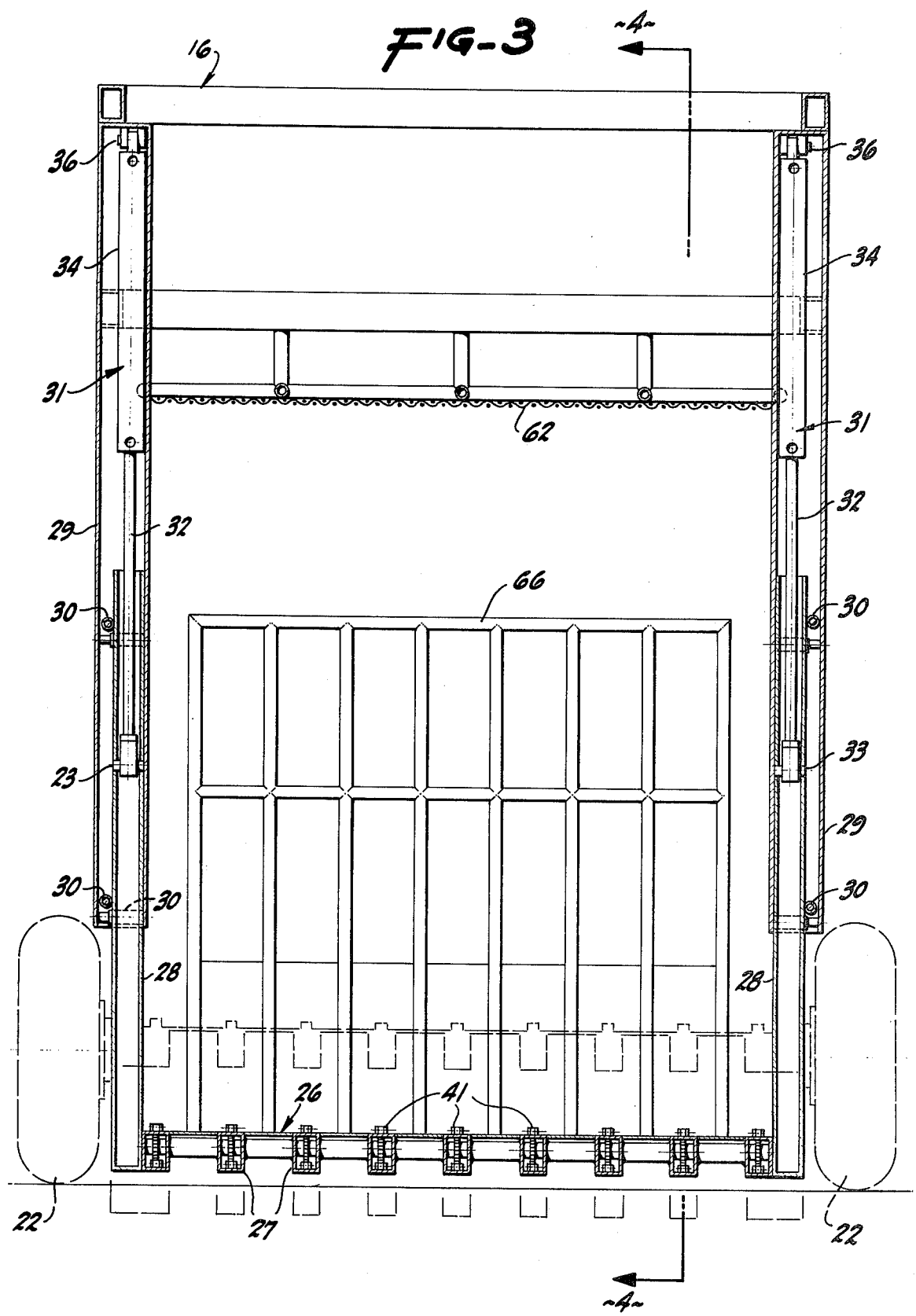

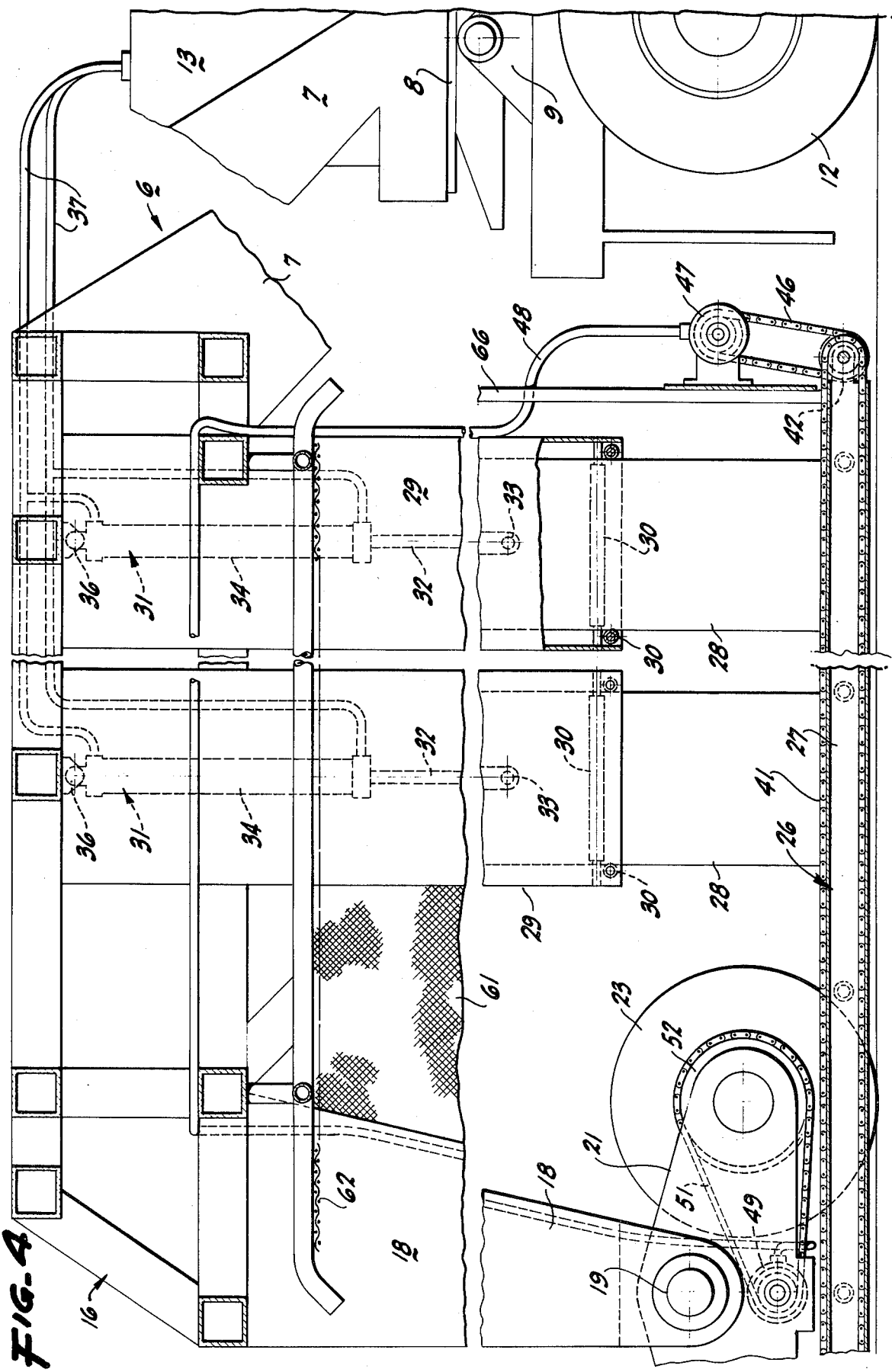

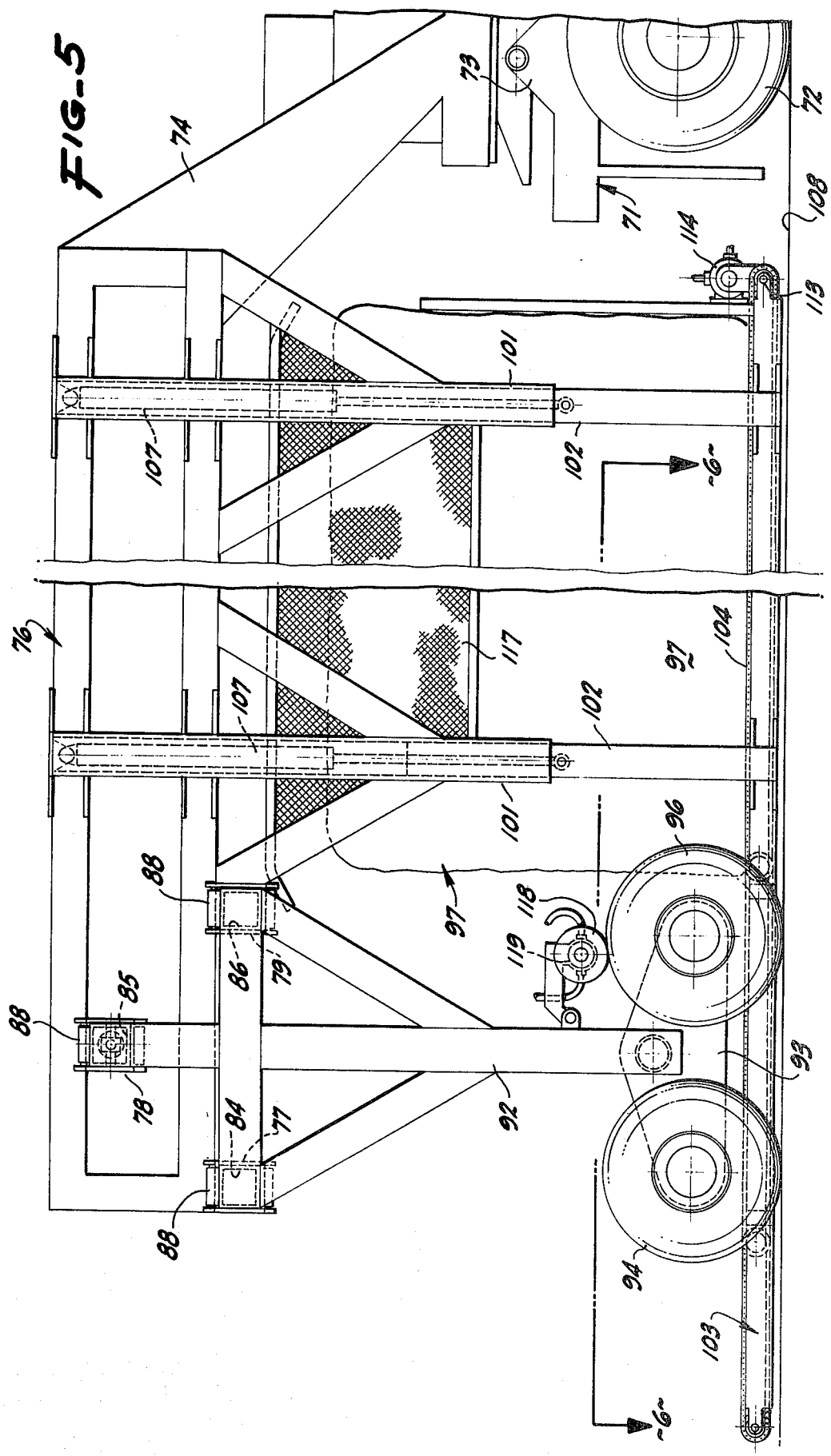

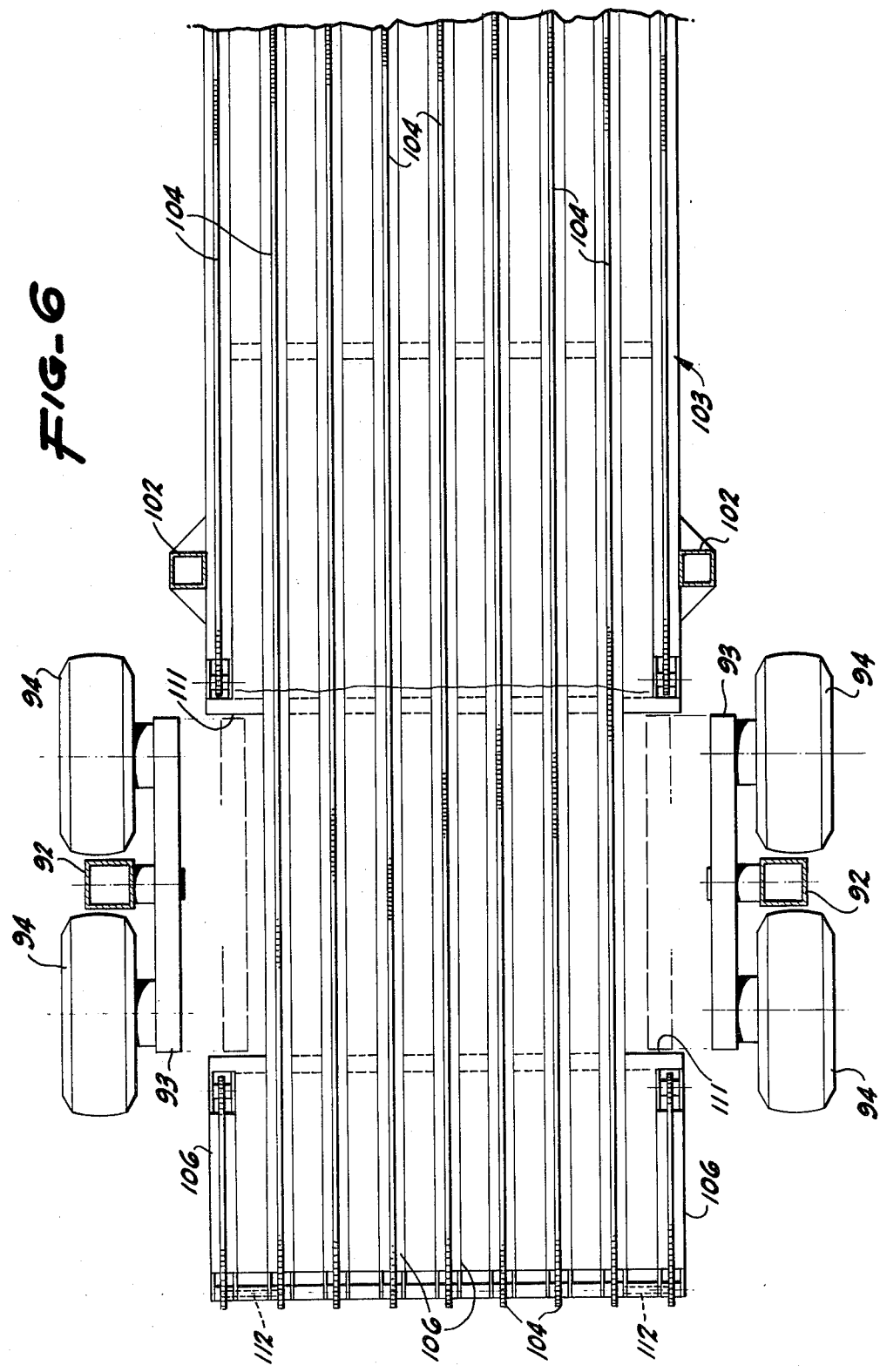

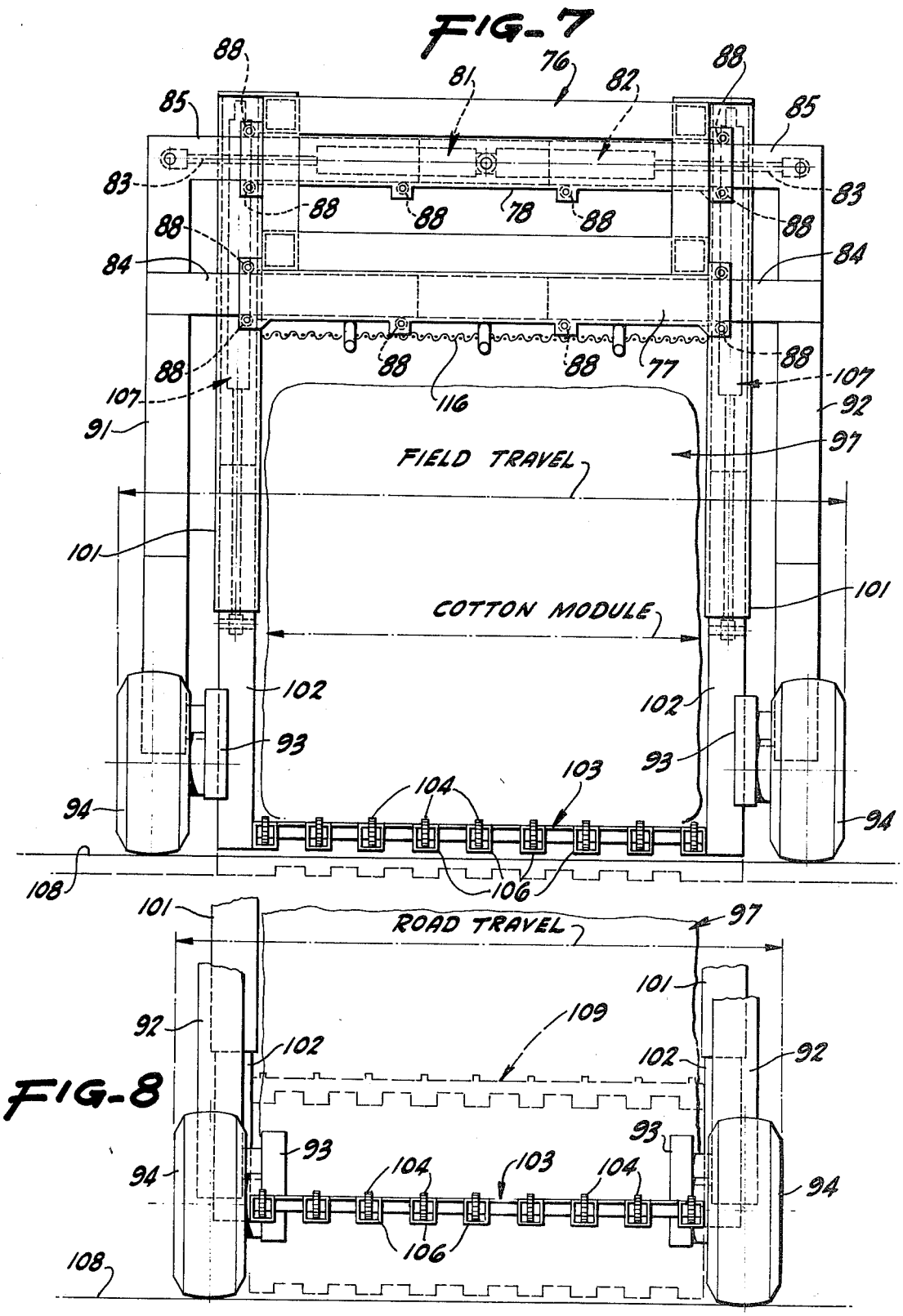

LOADING AND TRANSPORT VEHICLE

BRIEF SUMMARY OF THE INVENTION

In the transport and loading and unloading of relatively large, bulky loads such as haystacks, cotton modules, expanded foam products and the like, it is desirable to have a vehicle able to pick up the load resting on the ground in the field, then to transport the loaded material via standard highways to a discharge site, and then to unload the lading to the ground or floor at the site. Vehicles for this purpose have been patented; for example, as shown in the B. D. Schiltz U.S. Pat. No. 3,298,550 and the B. Schiltz U.S. Pat. No. 3,209,932, as well as in the Lisota U.S. Pat. No. 2,466,452 and the Gibler U.S. Pat. No. 2,468,055. While these are serviceable in particular environments under particular conditions, it is desired to provide an arrangement which can effectuate loading and unloading without in any substantial manner disturbing the load and which can be utilized on the highway and in the field, yet which can carry a load of substantial dimensions. This is accomplished by the present vehicle, which preferably has a variable tread for the ground-engaging wheels so as to meet both highway dimensional requirements as well as field restrictions, and can load easily without substantial force, can retain the load easily by pressing the load between a loading conveyor and a ceiling on the main vehicle, and which can readily be fabricated by standard methods.

BRIEF DESCRIPTION OF THE SEVERAL VIEWS OF THE DRAWINGS

FIG. 1 is a side elevation of one form of transport vehicle constructed pursuant to the invention, and shown in its lowermost loading and unloading position.

FIG. 2 is a view of the structure of FIG. 1 shown in a raised transport position.

FIG. 3 is a cross-section to an enlarged scale, the plane of section being indicated by the line 3—3 of FIG. 1.

FIG. 4 is a cross-section to an enlarged scale, the plane of section being indicated by the line 4—4 of FIG. 3, and portions being broken away to reduce the extent of the figure.

FIG. 5 is a side elevation of a modified form of vehicle, portions being broken away.

FIG. 6 is a cross-section of the vehicle shown in FIG. 5, the plane of section being indicated by the lines 6—6 of FIG. 5.

FIG. 7 is an end elevation of the vehicle shown in FIGS. 5 and 6 and in wide tread position.

FIG. 8 is an end elevation like FIG. 7 but showing the vehicle in narrow tread position.

DETAILED DESCRIPTION

The loading and transport vehicle pursuant to the invention can be embodied in two principal forms as shown herein. In the first form, which is for relatively light loads, the requirements of highway maximum width, length and load distribution are readily met. In order to provide for much heavier loads, the form of structure shown in FIGS. 5 through 8 is employed, utilizing a variable tread which can be minimized to lie within the highway limits and then extended when the vehicle is in the field and there are no width limits.

In the first or lighter load form of device, there is provided a trailer 6 at its forward end having a gooseneck 7 terminating in a fifth wheel connector 8 of any standard kind designed to interengage with and normally to rest upon a fifth wheel fitting 9 on a towing vehicle 11 such as a tractor. It will be understood that the tractor 11 is provided with a source of motive power to drive the rear wheels 12 thereof and also to drive any auxiliary equipment that is necessary. Some auxiliary equipment 13, especially a hydraulic power unit, is mounted above the fifth wheel and can receive its power from the tractor 11.

The gooseneck 7 is part of a main frame 16 comprised of the customary structural shapes and angles and is arranged to occupy a relatively high location with respect to the ground 17 and to extend in a generally longitudinal manner rearwardly to a pair of rear legs 18. At their lower ends the legs have journals 19 fitting equalizer beams 21 at their ends mounting ground-engaging wheels 22 and 23. The main frame 16 can be considered as an arch main frame for distributing load imposed upon it onto the fifth wheel mechanism 8 and onto all four of the ground-engaging wheels 22 and 23.

Designed to cooperate with the main frame 16 is a conveyor frame 26 preferably including, as shown in FIG. 3, a number of cross-connected box beams 27 extending for substantially the same length as the main frame and having an overall width about the same as the transverse dimension of a cotton module, for example, to be carried. This in most instances is of the order of seven feet. The conveyor frame 26 is disposed with respect to the main frame by having an interconnection therewith through vertical guides 28 secured at their lower ends to the conveyor frame and extending upwardly in a vertical direction to telescope within guide tubes 29 themselves secured to the main frame 16. The tubes 28 and 29 are preferably rectangular in horizontal cross-section and are relatively close fits, in some instances having antifriction rollers 30 interposed therebetween so that the guides can telescope vertically in a free and easy fashion and will confine the conveyor frame 26 to vertical rising and falling movement with respect to the main frame.

In order to move the conveyor frame relative to the main frame, there are interposed, preferably housed within the tubes 28 and 29, a number of hydraulically expansible chambers 31. In one instance the piston rod 32 of such a chamber is connected by a cross pin 33 to the inner tube 28, whereas the cylinder portion 34 thereof is at its end connected by a pin 36 to the upper portion of the main frame 16. In most instances, there are four of the telescoping guides employed, and since each guide has a hydraulically expansible chamber therein, the four expansible or elevator chambers are utilized in unison to lift or lower the conveyor frame as desired. For convenience, there are shown diagrammatically in FIG. 4 two of the hydraulically expansible chambers 31 connected by ducts 37 to the power mechanism 13. It is preferred that all of the hydraulically expansible chambers 31 be provided with flow governing valves of a standard sort so that when a main control valve, not shown, but made available to the driver in the leading vehicle 11, is actuated, all four of the hydraulically expansible chambers 31 expand uniformly or contract uniformly. The conveyor frame 26 is thus always uniformly lifted and lowered and so always retains a horizontal attitude.

The conveyor frame 26 is provided with any suitable sort of load moving conveyor and in the present instance includes a number of parallel, endless conveyor chains 41. At their forward ends, the chains are led around sprockets 42 and at their rearward ends led around sprockets 43, the sprockets being appropriately mounted in the box beams 27 so that the upper runs of the conveyors run on the tops of the boxes, and the lower runs of the chains run inside the boxes. This leaves the bottoms of the conveyor boxes open to the ground.

The sprockets 42 are preferably all on the same shaft and are operated by a shaft-engaging drive chain 46 (FIG. 4) propelled by a hydraulic motor 47. A special drive means is utilized to actuate the motor 47. This drive means can be incorporated with the control instrumentalities 13, but preferably is separate, or at least partially separate, in order that the speed of motion of the conveyor can be coordinated with the speed of rotation of one of the ground-engaging wheels and so coordinated with the rate of movement of the vehicle as a whole. To that end, the hydraulic motor 47 is connected through ducts 48 (FIG. 4) with a hydraulic pump 49 having a chain 51 connecting the pump to a sprocket 52 on one of the ground-engaging wheels such as 23. There are sufficient hoses included in the conduit 48 so that the conveyor can rise and fall and the wheel 23 can rise and fall with variations in the ground. The pump 49 is driven in a closed circuit with the motor 47. In this way, as the wheel 23 rotates, it drives the pump 49 at a corresponding speed, which displaces a corresponding amount of liquid to the drive motor 47 and so advances or retracts the upper run of the conveyor at the desired speed, preferably the same speed but in an opposite direction to the speed of the vehicle, so that the net, resulting speed on the conveyor top is zero.

Particularly for use with a cotton module, which sometimes is not particularly well contained nor protected, there are provided on the two sides of the main frame, particularly between the guides 29, screen panels 61 extending longitudinally in substantial vertical planes at the desired maximum width of the module and extending downwardly far enough to protect at least the top of the module, but stopping short of any location which might interfere with the operation of the mechanism. In addition, there is a ceiling 62 extending transversely and longitudinally in a horizontal plane at the top portion of the main frame, continuing in effect the confining character of the screen sides 61.

In the general operation of this mechanism, as partly illustrated in FIG. 1, the assembly is transported over the highway in empty condition, for example, to a point of use near a cotton module 63 resting on the ground 17 and provided in some instances with a covering tarpaulin 64. In use, the vehicle is lined up just ahead of the module in a straight line with respect thereto. The hydraulic chambers 31 are actuated and simultaneously lower the conveyor frame 26 to a point just above the ground, whereupon the cylinders 34 are hydraulically blocked and sustain the conveyor frame at the selected height. This is barely above the ground, very much as shown in FIG. 3. The motor vehicle, such as the tractor 11, is put into reverse gear, and the carrier is backed in alignment toward the cotton module.

As the vehicle is backed, the ground-engaging wheel 23 through the pump 49 and the motor 47 causes the upper run of the conveyor to move forwardly relative to the vehicle at the same speed that the vehicle moves rearwardly relative to the ground. The net speed of the conveyor upper run relative to the ground is zero or very nearly so. Since the upper run of the conveyor is but a few inches above the ground and is horizontal, the conveyor is easily inserted under the module with only a few inches of vertical displacement. The vehicle is backed over the module until the entire module has been brought to rest on the upper run of the conveyor.

In this loading operation, the module itself does not to any important extent move forwardly or backwardly. In effect, the module is simply progressively lifted the few inches between the ground and the upper run of the conveyor. The friction of the load against the chains moving around the sprockets 43 assists in this lifting. Chain tines are usually not necessary. Since the module is brought onto the conveyor in a generally horizontal position, and is not lifted bodily by the conveyor, the various conveyor chains such as 41 need only to burrow under the module and so can be ordinary, commercial, chain links. They do not need spikes or hooks, which might, if used, disrupt the bottom of the module. The conveyor chain links after rounding the sprockets simply lie stationary against the bottom of the module. If the conveyor speed is correctly regulated or very nearly correctly regulated, there is little or no motion of the horizontal chain links with respect to the bottom surface of the module. Further, the module always maintains its horizontal integrity and is not progressively compressed or "bent" as occurs in transferring a horizontal module onto or from an incline.

As the module is loaded, it is positioned between the side screens 61 and is laterally somewhat confined thereby. At the forward end, the conveyor frame has an upstanding openwork wall 66 so as to stop the module in a forward position and to retain the module against dislodgment.

When the module has been completely loaded, the vehicle is stopped. The conveyor chains 41 are stopped because there is no vehicle movement. The hydraulic chambers 31 are again simultaneously actuated to lift the conveyor frame and to lift the module a short distance, far enough to press the top of the module against the ceiling screen 62. The module, in effect, is clamped between the conveyor and the ceiling and thus is retained not only against wind dislodgment, but also is retained so as not to shift longitudinally on the trailer as the vehicle is transported.

When the load and conveyor frame have been lifted sufficiently to afford adequate ground clearance; for example, as shown in FIG. 2, the tractor pulls the vehicle forwardly and goes to a destination. At the destination the process is reversed; that is, the conveyor frame 26 is lowered almost to the ground, and the whole vehicle is driven forwardly. This reversely drives the upper run of the conveyor gradually to deposit the module gently on the ground without forward or rearward motion of the module and with simply a drop of the bottom thereof progressively through the few inches between the top of the conveyor and the ground.

In some instances, it is desired to weigh the module and the attendant vehicle enroute or at a destination. It is usual to have a scale platform at about road level and of a size shorter than the wheel base. When that is the situation, the vehicle is driven so that the trailer portion resides over the scale platform. The wheels, such as 22, 23 and 12, are off of the scale platform or are to the sides thereof. The hydraulic chambers 31 are then expanded and not only lower the conveyor frame 26 into contact with the scale platform, but offer even greater downward force. The force is sufficient to lift the main frame and the wheels 22 and 23 off of the ground and to lift the fifth wheel 8 slightly with respect to its bearing connection on the tractor trailer. In this way, the entire weight of the module and the trailer carrying device is registered by the scale. Since the weight of the carrying device is known from a previous empty weighing, there is afforded an indication of the net weight of the module.

The dimensions of the device just described are such that the overall distance from the outside to the outside of the wheels 22 and 23 is within the state highway limits even though the module itself is of the maximum module width. While the present drawings are not to scale, the proportions are approximately correct, and it will be observed that the elevating mechanism and the guide mechanism and the tires are all disposed in the relatively narrow side spaces between the maximum width of the module and the maximum highway tolerance for vehicle tire width.

In some instances, it is desired to carry a heavier module, and this requires the use of tires able to carry the extra load. This usually means that the width of the tires is necessarily greater than is indicated in the preceding figures. Since the module width cannot be reduced, this means that if tires of adequate width are utilized, the highway width restriction is violated. There is no such width restriction when the vehicle is utilized in a field or area off of the highway.

For that reason, an arrangement as shown in FIGS. 5 through 8 is employed for heavy loads. The general layout is approximately as previously described. There is a tractor 71 having a source of power therein effective to drive ground-engaging wheels 72. Connected through a fifth wheel 73 is the forward portion 74 of a main frame 76 inclusive of transverse box beams 77, 78 and 79. Within such transverse beams is a pair of hydraulically expansible chambers 81 and 82 in general alignment transversely of the vehicle. Their piston rods 83 at their outer ends are connected to the central pair of telescoping beams 84, 85 and 86 movable transversely within the outer, box beams 77, 78 and 79. Antifriction rollers 88 are employed.

The outer ends of the interior box beams are connected to vertical legs 91 and 92 having their outside faces normally within the maximum highway width limits. The legs 91 and 92 at their lower ends are jointed to balance beams 93 at their opposite ends carrying ground-engaging wheels 94 and 96. These wheels include relatively wide tires capable of handling a heavy load and normally disposed with their outer side walls within the highway limit.

With this arrangement, and preferably under control from the cab of the tractor 71 by a hydraulic circuit such as previously described, when there is no weight on the ground-engaging wheels, the hydraulic chambers 81 and 82 can be expanded to move the telescoping beams 84, 85 and 86 relative to each other to spread the pair of legs 91 and 92 and the wheel pairs 94 and 96 apart, thus increasing the tread to field value. A reverse operation of the hydraulic chambers moves the legs and the ground-engaging wheels inwardly toward each other, thus reducing the tread to highway value. In this way, the outermost dimensions of the legs and tires can be kept within highway limits when the tread is narrow, but can be increased substantially so that the inner margins of the wide tires are outside of and do not encroach upon the width limit of a module 97 being handled.

There are vertical, telescoping guide tubes 101 and 102 disposed at the sides of the main frame 76 and depending to support a conveyor frame 103 constructed almost entirely as previously described. The conveyor frame carries an endless chain conveyor 104 with the lower runs of the conveyor chains within box beams 106 of the conveyor frame and with the upper runs of the conveyor chains riding on top of the box beams, and preferably without hooks or spikes.

The range of motion of hydraulically expansible chambers 107 within the guides 101 and 102 is somewhat greater than before. The stroke of the chambers is great enough to lower the conveyor frame down onto the ground 108 and to exert sufficient force to lift the main frame 76 and the ground-engaging wheels 94 and 96 off of the ground. The contracting chambers 107 move far enough upwardly to lift the conveyor frame 103 high enough or to a predetermined height 109 above the ground so as to be above and to clear the maximum diameter of the ground-engaging wheels.

To assist the conveyor frame to clear the wheel structure when the wheels are in their innermost or narrow tread position, the sides of the conveyor frame have cutouts 111 or are relieved by the omission of certain short portions of the outside box beams 106 in the vicinity of the wheels. This also interrupts the outside pair of conveyor chains. The remaining, short portions or rearward portions of these chains are driven by stub shafts 112 from the adjacent chains, which themselves are driven from the forward part of the structure through a common shaft 113 and a drive motor 114 in the fashion previously described. In this instance, the screen ceiling 116, as well as screen sides 117, can be employed if desired. Furthermore, the top structure of the main frame may be displaced upwardly in an amount to compensate at least partially for the greater vertical movement of the conveyor frame 103.

In the operation of this form of the structure, it may be presumed that the vehicle is unloaded, the conveyor frame 103 is at a high level 109, and the tread of the wheels 94 and 96 is at a narrow limit within highway requirements (see FIG. 8). The vehicle can then be driven over the highway to the field site where a cotton module 97 is resting on the ground. The vehicle is lined up ahead of the module as before and is stopped. Thereupon, the hydraulic chambers 107 are expanded to move the conveyor frame 103 onto the ground and are expanded even farther to rest the entire vehicle weight on the conveyor frame, lifting the main frame 76 and the ground-engaging wheels 94 and 96 so that all weight is off of the rear ground-engaging wheels. Thereupon the hydraulic chambers 81 and 82 are expanded, thus moving the sliding or telescoping beams 84, 85 and 86 to separate and to move the ground-engaging wheels to their outermost, wide tread location (see FIG. 7). This is permissible because the vehicle is off of the highway.

With the ground-engaging wheels in their wide tread position, the chambers 107 are retracted, thus reimposing the vehicle weight on the fifth wheel and the ground-engaging wheels and lifting the conveyor frame 103 slightly above the ground. Under these conditions, the tractor 71 is then backed and the transport is telescoped over the cotton module with the conveyor 104 being inserted between the ground and the module bottom and with the upper run being propelled at an appropriate speed. The conveyor drive mechanism is a similar arrangement to the one described before except that the motion of the ground-engaging wheels 94 and 96 is transmitted through an intervening wheel 118 (FIG. 5) in frictional contact therewith to a hydraulic driving pump 119. The upper run of the conveyor moves at substantially zero ground speed.

The module 97 is displaced above the ground a few inches, only enough to put the bottom of the module on the upper run of the lowered conveyor. The vehicle is continually backed until the forward end of the module is at the forward end of the conveyor mechanism. During this motion, the module passes over the cutouts 111 adajacent the wide-spaced ground-engaging wheels, but the overhang of the module is sufficiently slight that drooping of the module is virtually zero. If the module must be supported in the cutout areas, telescoping or sliding supports can be pulled out of the conveyor frame temporarily.

When the module is arranged with its forward end at the forward end of the conveyor, it is fully loaded and the rear end of the module is ahead of the cutout portions of the conveyor frame.

As soon as the module is fully loaded, the chambers 107 at the sides are expanded so as to press the conveyor frame from its low, pick-up position (see FIG. 7) down onto the ground and to lift the ground-engaging wheels therefrom. Thereupon the horizontal cylinders 81 and 82 in the transverse telescoping tubes are retracted, so that the legs and the ground-engaging wheels, being now unloaded, are brought in from their wide tread position effective in the field to their narrow tread position suitable for the highway. As soon as this has been done, then the cylinders 107 or elevators for the conveyor frame are actuated to lift the conveyor frame. The cutouts 111 pass easily over the narrow-set wheel structure in an upward direction, and the module, being ahead of the wheels, has no adverse effect.

When the conveyor frame is in its high position 109 above the height of the tires, and preferably with the module pressed against the screen ceiling 116 on the frame so that the module is well held against accelerating and decelerating forces on the highway, the tractor 71 pulls the mechanism along the highway and within highway limits to the discharging site.

At the unloading location, off-highway, the vertical elevator chambers 107 are again actuated to force the conveyor frame 103 down against the ground and to lift the ground-engaging wheels 94 and 96 slightly. Those wheels are then moved from their inner narrow tread position to their outer, wide tread position out of the way of the module and to either side of its discharge location. Thereupon, the side chambers 107 are actuated to restore the weight of the vehicle to the ground-engaging wheels and to lift the conveyor frame 103 slightly. The conveyor chains 104 are then propelled in the opposite direction as the tractor 71 drives forwardly, and the module 97 is gently and progressively lowered a few inches onto the ground as the conveyor frame is pulled out from beneath it as the tractor 71 advances.

Having discharged the module, the vehicle can be rearranged to its highway position by again using the conveyor frame as a jack to lift the wheels off the ground, then utilizing the transverse cylinders 81 and 82 to pull the ground-engaging wheels into their narrow tread position, and then lifting the conveyor to any suitable transport height, so that the vehicle can return for another module.

In this way, not only is the module width respected, but the maximum outside dimensions of the machine are suitable for highway transport, even with extremely wide heavy load carrying tires, and the wheels and wheel structure can be moved out of the way in order to permit the free loading and unloading of modules.

I claim:

1. A loading and transport vehicle comprising an overhead, horizontally extending, elongated main frame; means at the front and rear of said main frame for supporting said main frame and including ground engaging wheel means; a horizontally extending, elongated conveyor frame disposed beneath said main frame and extending substantially for the full length and the full width thereof; a first pair of vertically telescoping tubes interconnecting the forward, opposite sides of said main frame and of said conveyor frame; a second pair of vertically telescoping tubes interconnecting the rearward, opposite sides of said main frame and of said conveyor frame; means for simultaneously telescoping said pairs of tubes to move said conveyor frame parallel to itself and toward and away from said main frame; a chain conveyor having an upper run; means for mounting said chain conveyor on said conveyor frame for bodily movement therewith in a vertical direction from a first horizontal position substantially near ground level to a second horizontal elevated position and with said upper run extending horizontally across and longitudinally along said conveyor frame; and means for operating said upper run longitudinally of said conveyor frame in either horizontal direction.

2. A device as in claim 1 in which said ground-engaging wheel means includes means for mounting said wheel means for movement between a first position under said conveyor frame when said conveyor frame is at said predetermined distance above the ground and a second position alongside said conveyor frame when said conveyor frame is on the ground.

3. A device as in claim 2 in which said mounting means constrains said wheel means to movement transversely of said main frame.

4. A device as in claim 2 including a hydraulic expansible chamber mechanism for moving said wheel means between said first position and said second position.

5. A device as in claim 2 including means for interrelating the rotary speed of said wheel means and the speed of advance of said conveyor.

6. A device as in claim 1 including a confining ceiling and sides on said main frame and disposed along the top and the sides of a load on said conveyor.

7. A device as in claim 1 including means for mounting said wheel on said main frame for transverse movement between a wide wheel position alongside said conveyor frame in said first position and a narrow wheel position under said conveyor frame in said second position.

8. A device as in claim 7 including a hydraulically expansible chamber mechanism for moving said wheel between said first and said second positions.

* * * * *